Nov. 25, 1947.　　I. L. ASHKENAS ET AL　　2,431,449
AIRPLANE YAW AND PITCH CONTROL
Filed April 24, 1945　　2 Sheets-Sheet 1
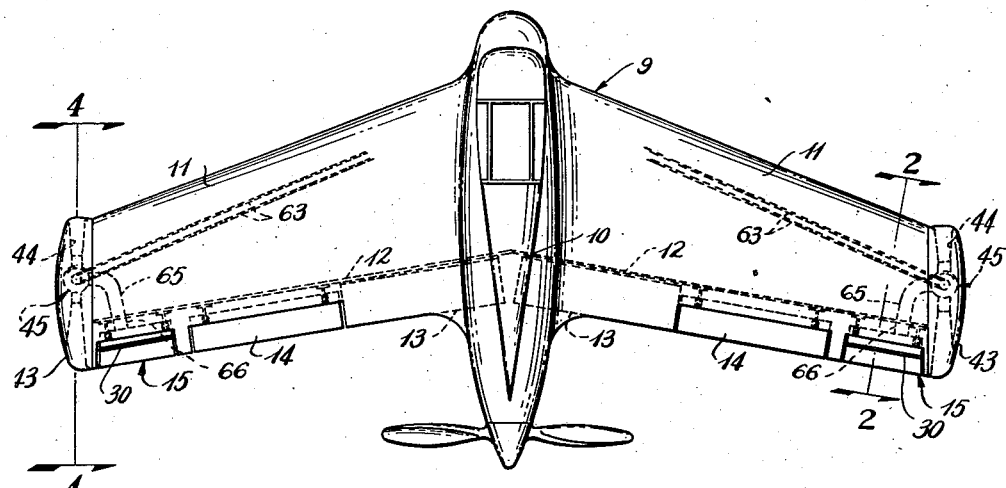
Fig. 1
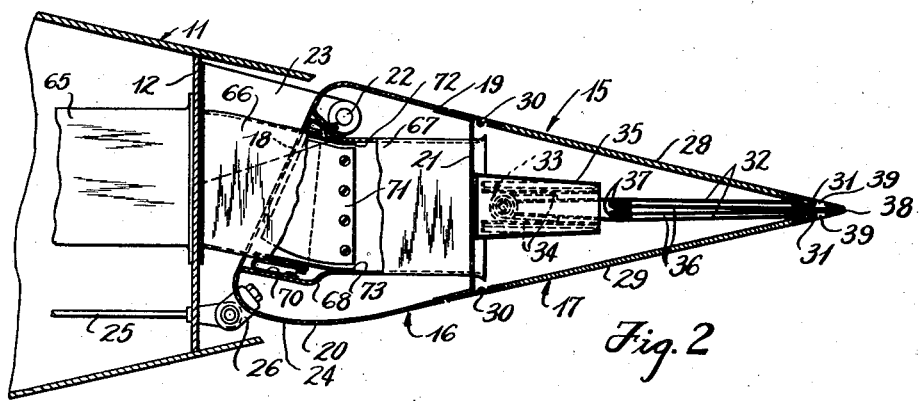
Fig. 2
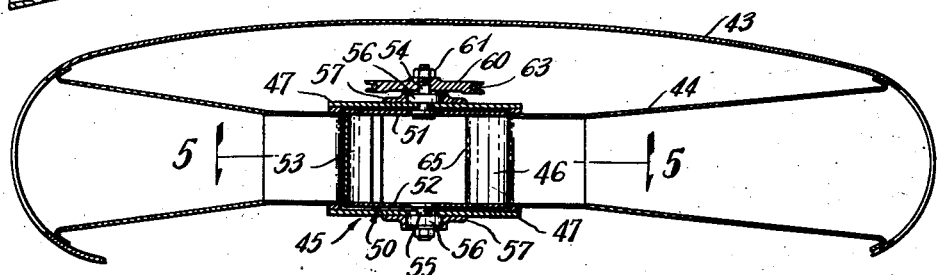
Fig. 4
INVENTORS
IRVING L. ASHKENAS
BY STUART A. KRIEGER
ATTORNEY

INVENTOR.
IRVING L. ASHKENAS
BY STUART A. KRIEGER

ATTORNEY

Patented Nov. 25, 1947

2,431,449

UNITED STATES PATENT OFFICE 2,431,449

AIRPLANE YAW AND PITCH CONTROL

Irving L. Ashkenas and Stuart A. Krieger, Los Angeles, Calif., assignors to Northrop Aircraft, Inc., Hawthorne, Calif., a corporation of California Application April 24, 1945, Serial No. 589,952

3 Claims. (Cl. 244—87)

The present invention relates generally to aircraft and more specifically to tailless airplanes, with particular reference to the directional, or yaw control means for such tailless airplanes. The general class of control means with which our invention is concerned is that utilizing drag-producing devices carried at the outer ends of the wing, which are connected to the rudder pedals of the airplane in such a manner that when one of the pedals is pushed forwardly, the device on the corresponding side of the airplane is actuated, creating an unsymmetrical drag condition and causing the airplane to yaw in the desired direction. If both pedals are depressed simultaneously to the same extent, both drag-producing devices are actuated together, and the resulting symmetrical drag acts to decelerate the airplane in a straight line. Another aspect of the invention, therefore, relates to drag-increasing devices used as air brakes in either tailless or conventional airplanes.

One form of rudder or air brake which has been found to be highly satisfactory from all practical considerations comprises a pair of flaps arranged in the top and bottom surfaces of the wing along the trailing edge thereof which are deflected simultaneously out into the airstream, creating a powerful drag. Some difficulty has been experienced, however, in overcoming the large hinge moments which are obtained, due to the fact that such flaps cannot, for aerodynamic reasons, be balanced in the same manner that control surfaces are balanced. Hence, it is common practice at the present time to employ hydraulic jacks or electric motors for operating the flaps. Hydraulic or electric motors for flight controls have certain objectionable features, however, chief of which is their dependence upon a source of power on the airplane. If that source of power fails for any reason, the devices which are actuated thereby become inoperative or must be operated manually by an emergency control system.

It is the primary object of the present invention, therefore, to provide an operating device such as a rudder, dive brake, or the like, which is actuated by means deriving its power from the airstream and which is not subject to failure of a power source on the aircraft. This object is achieved by employing an expansible chamber which is operatively connected to the rudder or dive brake and which is expanded and contracted by air pressure taken from the air-stream. To this end, duct means are provided having a forwardly facing airscoop positioned to take advantage of the maximum available positive pressure, and a rearwardly opening exit arranged to take advantage of the available negative pressure, with valve means for regulating the internal pressure in the chamber to secure the desired action.

Another object of the invention is to provide an aerodynamically actuated rudder or dive brake device which is highly responsive to actuation of its associated controls, and in which the rate of closing of the flaps is substantially the same as the rate of opening.

Another object of the invention is to provide a rudder or dive brake which is combined with one of the control surfaces so that the two members can be contained in the same area of the wing span, leaving the balance of the wing span for other essential control surfaces such as landing flaps or elevons. This is an important consideration, since the length of wing span available for flaps or control surfaces is limited and must be utilized to the fullest extent. In the case of tailless airplanes, the rudder-dive-brake devices may be combined with the pitch control flaps where the latter are mounted in the outer ends of the wings, so that the maximum effectiveness in yaw control is obtained. Where the invention is used on conventional airplanes solely as a dive brake, however, the device might well be combined with the lading flaps which usually extend from the fuselage out to the ailerons, since this arrangement would reduce the bending moments on the wing structure.

Other objects and advantages of our invention will become apparent to those skilled in the art after consideration of the following detailed description of the preferred embodiment thereof, reference being had to the appended drawings, in which:

Fig. 1 is a top plan view of a tailless airplane embodying a rudder and dive brake constructed according to the principles of the present invention;

Fig. 2 is an enlarged sectional view, taken along the line 2—2 in Fig. 1;

Fig. 4 is an enlarged sectional view taken along the line 4—4 in Fig. 1;

Figure 3:
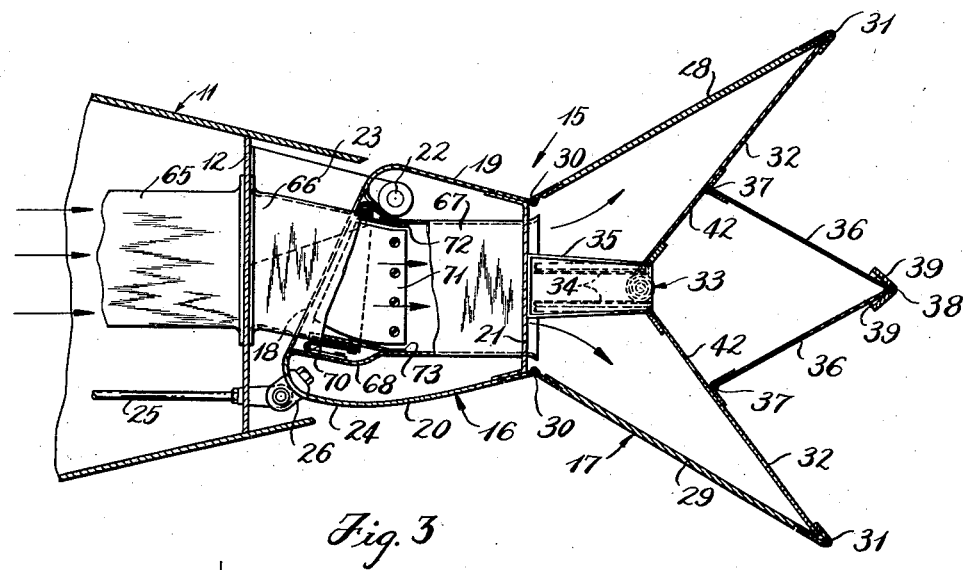
Fig. 3 is a view similar to Fig. 2, but showing the rudder flaps opened.

In the drawings, the reference numeral 9 designates a tailless airplane having a fuselage 10 and wings 11. Arranged in the trailing edge portion of the wing and supported on the rear spar 12 thereof for vertical swinging movement are landing flaps 13, elevons 14, and pitch trim flaps 15, the latter being disposed in the outer ends of the wings. The elevons 14 are rigged in the usual manner for simultaneous up and down movement to provide pitch control and for swinging movement in opposite directions to provide roll control. The pitch trim flaps 15 are provided to counterbalance the diving moments produced on the airplane when the landing flaps 13 are lowered, and to this end they are rigged for simultaneous up and down movement. The controls for moving the landing flaps 13 and elevons 14 may be of any conventional form, and are not shown.

Each of the trim flaps 15 is formed to carry out the contour of the wing airfoil section when in neutral position, and comprises a nose section 16 and a trailing edge section 17. The nose section 16 is preferably in the form of a box having an inclined front wall 18 and top and bottom skins 19 and 20 which are fixed at their rear edges to the flanges of a vertical spar 21. The flap 15 is pivotally supported near the upper corner thereof on bearings 22 mounted in bearing brackets 23 which are fixed to and extend rearwardly from the rear spar 12 of the wing. Since the range of movement of the flap is primarily upward from neutral position, the lower skin 20 is curved in an arc at 24 about the hinge axis 22 as a center to provide a smooth transition from the lower skin of the wing to the flap when the latter is deflected. The pitch trim flap 15 is moved up to the operating position by means of a push rod 25 which is pivotally attached to a fitting 26 on the bottom edge of the flap. The push rod 25 extends forwardly from its point of attachment with the flap through a hole in the wing spar 12 and is preferably connected to a hydraulic or electrical jack (not shown) which is operated simultaneously with the extension mechanism for the landing flaps 13. Hence, the pitch control flaps 15 are deflected upwardly at the same time that the landing flaps 13 are deflected downwardly, and the diving moment produced by the landing flaps is counterbalanced by a stalling moment produced by the pitch control flaps.

The trailing edge section 17 preferably comprises upper and lower rudder flaps 28 and 29 which are attached to the spar 21 by piano hinges 30. Connected to the trailing edges of the flaps 28, 29 by hinges 31 are bellows flaps 32 which extend forwardly therefrom and are hinged to a roller guide member 33. The roller 33 travels along a track 34 on a bracket 35 which is fixed to and extends rearwardly from the spar 21, and functions to limit the extent of opening of the flaps 28, 29 as well as to stabilize the action of the flaps so that they both open simultaneously at an equal rate and to equal angular deflection. Bellows flaps 36 are connected to the flaps 32 intermediate their ends by hinges 37 and are joined together at their trailing edges by a piano hinge 38. As shown in Fig. 2, the hinge 38 lies to the rear of the hinges 31 when the flaps 28, 29 are closed, and fairing pieces 39 are carried by the bellows flaps 36 to provide a smooth fairing from the trailing edges of flaps 28, 29 to the hinge 38.

From the foregoing description, it is seen that the rudder flaps 28, 29 together with the bellows flaps 32 and 36 form an expansible chamber or bellows which can be expanded by introducing air under pressure to the interior thereof. Openings 42 (see Fig. 3) are provided in the bellows flaps 32 between hinges 37 and roller guide member 33 so that the bellows flaps 36 are exposed to the same pressures as flaps 32 and 28, 29.

The air pressure for expanding the bellows is taken from the airstream, and to this end a fore and aft extending duct housing 43 is provided on the outer end of the wing 12, said housing being generally circular in cross section and faired into the wing to form the tip thereof. A Venturi duct 44 extends lengthwise through the housing 43 and opens at its opposite ends into the airstream, the front end opening forwardly into the wind as an air scoop to take advantage of the maximum available dynamic pressure and the back end opening rearwardly, or down wind, to take advantage of the negative pressure available at this point.

Arranged in the reduced throat of the duct 44 near the midpoint thereof is a valve 45, the preferred form of which comprises a cylindrical chamber 46 with its axis disposed vertically. The chamber 46 is closed at the top and bottom by circular end plates 47, and contained within the chamber is rotary valve member 50 having ends 51, 52 and a thin-walled arcuate gate 53 which fits snugly against the inner surface of the chamber. Stub shaft 54 and 55 are fixed to the ends 51, 52 of the valve member, and these project outwardly through holes in the end plates 47 and are journaled in bearings 56 which are held by bearing plates 57. The top stub shaft 54 projects beyond its bearing 56 and has a pulley 60 mounted thereon which is secured by a nut 61. A cable 63 is trained around and fastened to the pulley 60 and extends in toward the fuselage 10 of the airplane where it is operatively connected to the rudder pedal or other control (not shown).

Air pressure from the valve 45 is conducted to the bellows on the pitch control flaps 15 through a conduit 65 which opens into the valve chamber 46 at a point midway between the openings of the duct 44. The conduit 65 extends laterally from the valve 45 and then bends rearwardly to a point of attachment on the spar 12 immediately ahead of the flap 15. The spar 12 has an aperture therein corresponding in size and shape to the interior of the conduit, and mounted on the back side of the spar is an extension 66 of the conduit which projects through an opening in the front wall 18 of the flap. Fixed to the inside surface of the wall 18 is a rearwardly extending conduit 67 which is enlarged at 68 to receive the rear end of the extension 66. The conduit 67 passes through and is sealed to an opening in the flap spar 21 and terminates in the expansible chamber formed by the flaps 28, 29 and their associated bellows flaps.

The rear end of the conduit extension 66 is sealed to the conduit 67 by flexible seal means permitting relative movement therebetween while preventing leakage of air, said seal means preferably comprising an air-tight fabric hood 70 which surrounds and is attached to the conduit extension 66 and to the conduit 67. The hood 70 has sufficient slack in it to permit movement of the flap 15 to its extreme position. The gap between conduits 66 and 67 is additionally bridged by sliding plates 71, 72, and 73 which are fixed to the sides, top, and bottom, respectively, of the conduit 67 and extend into and bear against the corresponding inner surfaces of the conduit 66. The plates 71, 72, and 73 are shaped to accommodate relative movement between their respective surfaces and are preferably spring biased to exert a slight pressure on the walls of conduit 66 so as to aid in maintaining alignment between the two lengths of conduits.

The operation of the invention is as follows: In normal flight, the valve gate 53 is maintained in a neutral position midway between the extreme positions shown in Figs. 5 and 6. The flow of air through the Venturi duct 44 creates a sub-atmospheric static pressure condition in the valve 45 which is communicated to the bellows through the conduits 65, 66, and 67, causing the bellows to be held closed by the pressure on the outside of the flaps. The design of the Venturi duct 44 should be such that the reduced pressure in the bellows chamber is just sufficient to insure holding the flaps closed, as too low an initial pressure tends to cause a lag in the operation of the device. When the flaps 28, 29 are to be opened either as air brakes or as rudders, the rudder pedals are depressed, causing the valve gate 53 to rotate to the position shown in Fig. 6 or to an intermediate position wherein the exit side of the duct 44 is fully or partially closed and the entrance side is correspondingly opened to the bellows chamber. The dynamic pressure of the airstream is now applied to the bellows, opening it against the external pressure of the airstream to the position shown in Fig. 3. If the bellows are to be only partially opened, the valve gate 53 is rotated to a position wherein the exit side of the duct 44 is only partially closed so that the pressure in the bellows chamber is an intermediate pressure representing a mixture of the positive and negative pressures at the entrance and exit of the duct. In this case, the flops 28, 29 open to a position where the external pressure acting thereon is exactly balanced by the internal pressure, and a condition of equilibrium is obtained.

Figures 5, 6:
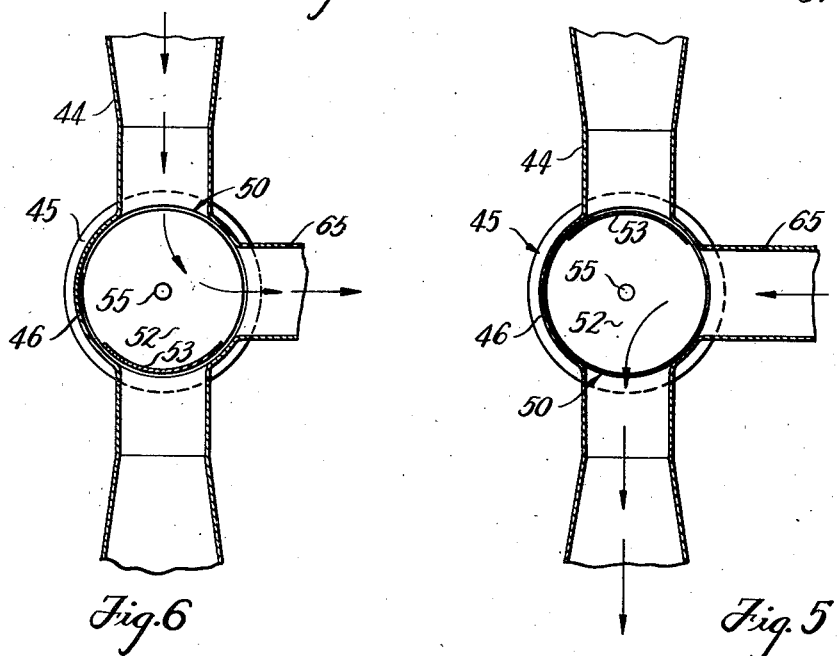
Fig. 5 is a sectional view taken along the line 5—5 in Fig. 4, showing the valve in one extreme position.
Fig. 6 is a similar view, showing the valve in the other extreme position.

Movement of the valve to the position shown in Fig. 5 produces a faster closing action than that obtained if the valve is merely returned to neutral. This accelerated response of the flaps is highly desirable for maximum maneuverability of the airplane, and results from the fact that the negative pressure obtainable at the exit of the duct 44 is greater than that created in the valve chamber by the flow of air straight through the venturi. Obviously, the greater the differential between the pressure acting on the outside surfaces of the flaps and that acting on the inside surfaces, the faster the response of the flaps to movement of the valve. Another factor contributing to this improvement in response of the flaps in closing over that obtained when the valve gate 53 is merely returned to neutral resides in the fact that energy losses due to mixing of the venturi-duct flow with the bellows-chamber-duct flow are avoided.

While the particular apparatus herein shown and described in detail is fully capable of attaining the objects and providing the advantages hereinbefore stated, it is to be understood that it is merely illustrative of the presently preferred embodiment of our invention, and that we do not mean to limit ourselves to the details of construction or design herein shown, other than as defined in the appended claims.

We claim:

1. In a tailless airplane having a wing, a pitch control flap mounted on the outer end portion of said wing along the trailing edge thereof for vertical swinging movement, a pair of rudder flaps hinged to the top and bottom surfaces of said pitch flap and forming the trailing edge thereof, means cooperating with said rudder flaps to form an expansible bellows, and means for varying the air pressure within said bellows to open or close the same.

2. In a tailless airplane having a wing, a pitch control flap mounted on the outer end portion of said wing along the trailing edge thereof for vertical swinging movement, a pair of rudder flaps hinged to the top and bottom surfaces of said pitch flap and forming the trailing edge thereof, means cooperating with said rudder flaps to form an expansible bellows, duct means arranged in said wing, the front end of said duct means opening forwardly into the airstream and the rear end thereof opening rearwardly into the airstream, a conduit intersecting said duct means, said conduit communicating with said expansible bellows, a valve arranged in said duct means at the intersection of said conduit for selectively opening the conduit to either the front or rear end of said duct means, and means for controlling the operation of said valve.

3. In a tailless airplane having a wing, a pitch control flap mounted on the outer end portion of said wing along the trailing edge thereof for vertical swinging movement, a pair of rudder flaps hinged to the top and bottom surfaces of said pitch flap and forming the trailing edge thereof, means cooperating with said rudder flaps to form an expansible bellows, a fore and aft extending duct arranged in the tip of said wing, the front end of said duct opening forwardly into the airstream and the rear end thereof opening rearwardly into the airstream, a conduit intersecting said duct laterally, said conduit communicating with said expansible bellows, a cylindrical valve chamber arranged in said duct at the intersection of said conduit, an arcuate valve gate rotatable between a first position closing said duct on one side of said chamber to divert the air entering said duct into said expansible bellows, and a second position closing said duct on the other side of the chamber to exhaust the air in said bellows through the duct exit, and means for rotating said valve gate.

IRVING L. ASHKENAS.
STUART A. KRIEGER.

REFERENCES CITED

The following references are of record in the file of this patent:

UNITED STATES PATENTS

| Number | Name | Date |
|---|---|---|
| 1,931,928 | Lippisch | Oct. 24, 1933 |
| 954,270 | Eberman | Apr. 5, 1910 |
| 2,075,817 | Loerke | Apr. 6, 1937 |
| 2,369,152 | Lowell | Feb. 13, 1945 |
| 2,279,615 | Bugatti | Apr. 14, 1942 |
| 1,864,236 | Evrard | June 21, 1932 |
| 1,851,907 | Hill | Mar. 29, 1932 |
| 2,392,443 | Youngman | Jan. 8, 1946 |

FOREIGN PATENTS

| Number | Country | Date |
|---|---|---|
| 562,365 | Great Britain | June 29, 1944 |
| 402,645 | Great Britain | Dec. 7, 1933 |